July 4, 1939. D. W. EXNER 2,165,040
BATTERY-TAPER RELAY
Filed June 26, 1936
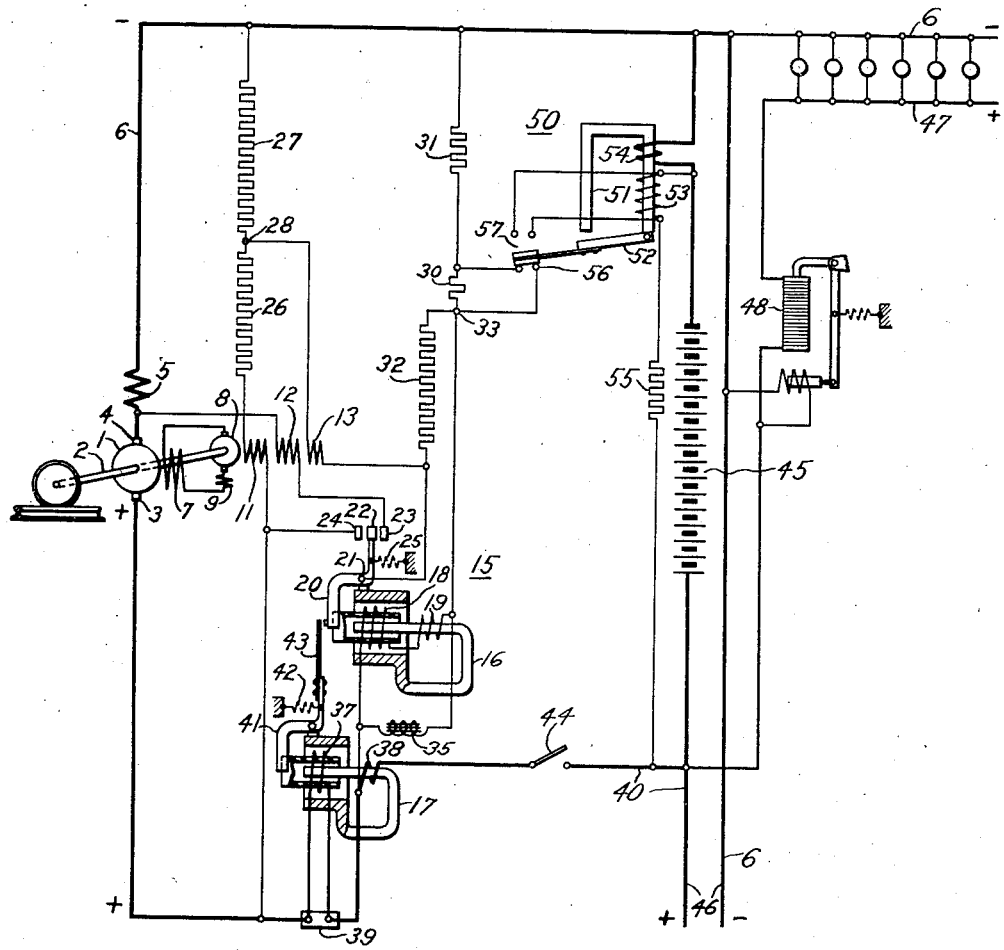
WITNESSES:
Wm. B. Sellers
Wm. C. Groome
INVENTOR
Donald W. Exner.
BY O. B. Buchanan
ATTORNEY Patented July 4, 1939

2,165,040

UNITED STATES PATENT OFFICE 2,165,040

BATTERY-TAPER RELAY

Donald W. Exner, Forest Hills, Pa., assignor to Westinghouse Electric & Manufacturing Company, East Pittsburgh, Pa., a corporation of Pennsylvania Application June 26, 1936, Serial No. 87,365

6 Claims. (Cl. 171—314)

My invention relates to an improvement in battery-charging systems, particularly such as are utilized on railway cars or other self-propelled transportation-devices. The particular feature of my invention is the utilization of a so-called battery-taper relay, or equivalent means, in such a charging system, for automatically tapering or reducing the charging rate when the battery is fully charged.

An important object of my invention is to provide a novel battery-taper relay which will pick up at a much smaller value of current, when the current is flowing in the charging direction, than when the current is flowing in a discharging direction, and which will drop out at a current which is not greatly below the pick-up value for charging currents; and to provide a novel battery-charging system utilizing said relay, particularly a battery-charging system which is provided with means for limiting the maximum output of the charging generator.

With the foregoing and other objects in view, my invention consists in the constructional features, combinations, methods, and systems hereinafter described and claimed, and shown in the accompanying drawing, the single figure of which is a diagrammatic view of circuits and apparatus embodying my invention in a preferred form.

I have shown my invention, by way of illustration, as being embodied in a 32-volt battery-charging system for a railway car, having an axle-generator 1 which is mounted directly on, or otherwise driven by, the axle 2 of the railway car. The axle-generator is provided with a positive brush 3 and a negative brush 4. Connected in series with the negative brush of the axle-generator is a commutating winding 5, the outside terminal of which is connected to the negative bus 6.

The generator 1 is provided with an exciting field winding 7 which is energized by means of a small exciter 8 which is also mounted on the axle 2 and which is provided with a commutating winding 9. The exciter is provided with two main field windings 11 and 12, and with a differential field winding 13, substantially as shown and described in a patent to Krapf and Sherrard, No. 1,971,109, granted August 21, 1934, and assigned to the Westinghouse Electric & Manufacturing Company.

The voltage of the axle-generator 1 is controlled by means of any suitable voltage-regulator 15, the illustrated regulator being, in general, similar to that which is described and claimed in the patent just mentioned. The voltage-regulator 15 is illustrated as being segregated into two parts, namely a voltage-regulator proper, 16, and a current-limiting element 17, both of which are constructed on the principle of the Schaelchlin relay which is described in the patent to Schaelchlin No. 1,820,712, granted August 25, 1931, and assigned to the Westinghouse Electric & Manufacturing Company. The voltage-relay proper, 16, has a movable voltage coil 18 and a stationary voltage coil 19 so arranged as to produce a voltage-responsive actuating force which is not materially affected by jarring or by the position of the movable member 20 of the regulator. The movable member 20 is pivoted at 21 and terminates in a movable contact 22 which is movable between two stationary contacts 23 and 24, the movable contact 22 being normally biased against the stationary contact 23 by means of a spring 25.

The first main field winding 11 of the exciter 8 is connected between the positive generator-terminal 3 and two serially connected resistors 26 and 27, the latter being connected to the negative bus 6. The second main field winding 12 of the exciter is connected between the stationary regulator-contact 23 and the negative generator-terminal 4. The differential field winding 13 of the exciter is connected between the movable regulator-contact 22 and the junction-point 28 between the two resistors 26 and 27. The stationary regulator-contact 24 is connected to the positive generator-terminal 3. The two voltage-coils 18 and 19 of the regulator are connected between the positive generator-terminal 3 and two resistors 30 and 31, the latter being connected to the negative bus 6. The movable regulator-contact 22 is also connected to one terminal of a resistor 32, the other terminal of which is connected to the junction-point 33 between the voltage-winding 19 and the resistor 30.

The voltage-regulator proper, 16, operates as follows. When the voltage-responsive force which is developed by the regulator reaches a value sufficient to overcome the biasing spring 25, such as, at a voltage of 30-volts, the regulator begins vibrating, with its movable element 22 vibrating against the stationary contact 23. At still higher voltages, such as 36 or 37 volts, the regulator will vibrate with its movable contact 22 vibrating against the other stationary contact 24. This operation is described in the Krapf and Sherrard patent previously mentioned, and need not be repeated in greater detail.

I have shown my voltage-regulator proper, 16, as being provided with an inductive shunt 35 connected around the two voltage-coils 18 and 19. This shunt is described and claimed in an application of C. R. Hanna, Serial No. 74,705, filed April 16, 1936, patented April 19, 1938, No. 2,114,841 for Regulating systems, assigned to the Westinghouse Electric & Manufacturing Company. It is an anti-hunting device which has a much higher inductance than the voltage-coils 18 and 19 at the frequency at which the regulator tends to hunt, so that, at this hunting frequency, the shunt 35 diverts more current into the voltage coils 18 and 19, thus counteracting the hunting tendency.

The current-limiting element 17, which I have illustrated, is one form of a means which is utilized, in one form or another, and in practically all voltage-regulating systems for axle-generators, and is for the purpose of protecting the axle-generator 1 by limiting the maximum current which it is called upon to deliver, this current-limiting function being accomplished by reducing the voltage of the generator. It is possible to have the current-responsive part of my regulator operating at all times, but it is sometimes desired to cause the current-responsive feature to be operative only after the current exceeds a certain predetermined amount, and I have so illustrated the device in my drawing.

The current-limiting element 17 is provided with a movable current-coil 37 and a stationary current-coil 38, both of which are responsive to the generator current, the movable coil 37 being illustrated as being connected in parallel to a shunt 39 which is serially connected between the positive generator-terminal 3 and the stationary coil 38, while the stationary coil 38 is connected in series between the shunt 39 and the positive bus 40. The movable element 41 of the current-limiting element 17 is normally biased to an inactive position by means of a spring 42, and is provided with a spring-extension 43 which presses against the movable element 20 of the voltage-regulator proper, 16, when the current in the current-limiting element reaches a value at which the operating torque overcomes the biasing spring 42, so that thereafter the current-responsive force of the element 17 assists the voltage-responsive force of the element 16 in overcoming the biasing spring 25 of the element 16, thereby reducing the voltage of the generator.

A reverse-current switch 44 of any suitable description is illustrated as being interposed between the series coil 38 and the positive bus 40. This switch 44 should be opened whenever the generator voltage is less than the voltage across the positive and negative buses 40 and 6.

Connected across the positive and negative buses 40 and 6 is a storage battery 45.

My invention is particularly applicable to a railway-car battery-system in which large blocks of power are drawn from the system, at certain times, as indicated by a heavy power-circuit 46 which may be utilized for supplying power to air-conditioning equipment or any other heavy load-device. Normally, also, the battery-system is utilized for supplying power to a lighting circuit 47, and it is customary to connect a voltage regulator 48, such as a carbon-pile regulator, in series with the lighting circuit 47, for the purpose of compensating for the difference between the charging voltage and the discharging voltage of the battery 45.

The equipment thus far described in detail was known prior to my invention.

According to my present invention, as shown, I add a battery-taper relay 50, which is illustrated as being a relay of the clapper type, having a stationary magnetic member or core 51, and a movable magnetic armature or clapper 52 which is biased toward open position, as by gravity. The core 51 carries a shunt coil 53 and a series coil 54. The shunt coil 53 is responsive to the voltage of either the battery or the generator, being shown as being connected across the battery 45, with a resistor 55 in series with the shunt coil 53. The series coil 54 is responsive to the battery current, being shown as being connected between the negative bus 6 and the negative terminal of the battery. The movable armature 52 carries a back contact member 56 which is connected across the resistor 30, and a front contact member 57 which is connected across the shunt coil 53.

When the battery current is flowing in the charging direction, the magnetizations of the shunt and series coils 53 and 54 are in the same direction, so that the voltage-responsive shunt coil 53 assists the series coil 54 in causing the battery-taper relay 50 to "pick up", or move from its unactuated position to its actuated position. When the battery-taper relay 50 picks up, it inserts the resistor 30 in series with the voltage regulator 15, thereby causing the voltage regulator to maintain the so-called "abnormal" or higher voltage conditions in the axle-generator 1. At the same time, the picking up of the battery-taper relay 50 results in the short-circuiting of the shunt coil 53, so that this coil no longer produces a magnetization assisting the series coil 54 to hold the relay "in". However, the movable armature 52 of the relay is now held against, or approximately in contact with, the stationary magnetizable core 51 of the relay, and the design of the relay is such that the current coil 54, unassisted by the shunt coil 53, is sufficient to hold the armature 52 in its actuated position, until the battery current falls to a value which is somewhat smaller than the value needed to cause the relay to pick up.

It is a function of my battery-taper relay to remain in its actuated position during what is known as the "abnormal" or high-rate charging-current conditions of the battery 42. During these conditions, the battery is not fully charged, and it is desirable to charge the same at the full or maximum rate. However, after the battery has become fully charged, it is very essential to stop sending the full charging current into the battery, otherwise very considerable damage may be done by the resultant "gassing". When the battery is fully charged, however, its voltage automatically increases, and since the voltage of the generator is held more or less constant by the voltage regulator, the charging current delivered by the generator decreases or "tapers off".

In the particular system illustrated in my drawing, the charging current tapers off to less than 60 amperes when the battery is fully charged, and I design my battery-taper relay 50, so that it drops out when the battery-current falls below 60 amperes. The dropping out of the battery-taper relay cuts out the resistor 30 from the regulator circuit, and thus reduces the voltage of the axle-generator 1, so that the charging rate is reduced to a safe value at which the battery can float without damage.

Assume, now, that the battery 45 is fully charged, and that the battery-taper relay 50 has dropped out, so that the generator 1 is operating at a reduced voltage, to give only a small, harmless charging current. If a heavy load is now thrown onto the load-circuit 46, for example, the axle-generator 1 may supply most or all of that load, because its voltage is held approximately constant by means of the voltage-regulator. If, now, the current drawn from the generator by the load is in excess of the maximum current for which the current-limiting element 17 is adjusted, this element will come into play and will operate to still further reduce the generator voltage, thus throwing more of the load on the battery 45 which is connected in parallel to the generator. The battery 45 will, therefore, furnish a discharging current to the load, and this discharging current may well be considerably in excess of the "pick-up" value of the charging current, that is, the current which causes the battery-taper relay 50 to pick up when the current is flowing in the charging direction.

My illustrated relay has a pick-up value of about 90 amperes, when the battery-current is flowing in the charging direction so that the magnetizations of the shunt and series coils 53 and 54 are assisting each other. However, when the battery current is flowing in the discharging direction, as when it is flowing into the heavy load connected to the load circuit 46 just discussed, the magnetization of the series coil 54 is in the direction opposite to that of the shunt coil 53, so that the shunt coil 53 opposes the action of the series coil and prevents the battery-taper relay from picking up, in response to current flowing in the discharging direction, until a very high discharging current is obtained, such as of the order of 200 to 250 amperes in the illustrated system. The design is such that the maximum discharging current of the battery 45, when it is operating in parallel with the generator 1, does not reach a value sufficient to cause the battery-taper relay 50 to pick up.

The reason for preventing the actuation of the battery-taper relay in response to a discharge current is that, if this operation were permitted, the battery-taper relay 50 would pick up as soon as the current-responsive element 17 made itself felt by transferring enough of the excessive load-demand from the generator to the battery. If the battery-taper relay 50 were permitted to pick up under these circumstances, that is, in response to the increased discharge-current from the battery, the generator voltage would immediately be increased, thereby causing the generator to take more of the load, notwithstanding the effect of the current-limiting element 17. Under certain load-conditions, it is obvious that this might, in turn, cause a sufficient reduction in the battery current to permit the battery-taper relay 50 to drop out again, thus resulting in a slow "pumping" or fluctuation of the voltage, causing repeated voltage-changes which appear as disturbances in the car-lighting circuit 47, and which cannot be smoothed out by the usually heavily damped lamp-voltage regulator 48.

It will thus be seen that my novel battery-taper relay 50, with its shunt and series coils 53 and 54, the shunt coil being cut out when the relay is actuated, accomplishes two purposes as a result of the operation of the shunt coil 53. The shunt coil reduces the pick-up value of the relay which, in a rugged clapper type of relay, is usually several times the drop-out value. Thus my shunt coil 53 causes the pick-up and drop-out currents of the relay to approach fairly closely to each other, without having to resort to an extremely delicate, sensitive relay construction. In the second place, my shunt coil 53 gives the relay a selective action, so that it will pick up readily in response to charging currents but will not pick up in response to discharging currents, thereby making it possible to successfully utilize my relay in the automatic regulation of the charging rate of the battery, so as to prevent gassing when the battery is fully charged.

The need for an automatic battery-taper relay such as I have described will be more readily understood when it is appreciated that a railway car, for which my invention is particularly adapted, is subject to wide fluctuations in service-conditions, not only because of wide fluctuations in the demand of the air-conditioning equipment or other heavy-duty load-devices which are connected to the load-circuit 46, but also because of the different "runs" on which the railway-car is utilized. Thus, perhaps, one day the car will be utilized on a slow-speed run, with many stops, with a resulting low generating time available for charging the battery. On another day, the railway-car may be operated on a high-speed run, with few stops, where the generator is able to charge the battery for a large percentage of the total time. Some automatic means is urgently needed, for permitting the battery to charge at its maximum rate when it needs the charge, as on a slow-speed run or on a particularly hot day when the air-conditioning demands are a maximum, while effectively preventing the ruination of the battery by excessive gassing on runs in which the battery remains substantially fully charged most of the time.

While I have illustrated my invention in a single form of embodiment, which is at present preferred by me, it will be obvious that many features are subject to change and substitution without departing from the essential spirit and scope of my invention. I desire, therefore, that the appended claims shall be accorded the broadest construction consistent with their language and the prior art.

I claim as my invention:

1. Automatic regulating means for a storage-battery charging-system comprising a variable-voltage source of direct current, a storage battery adapted to be connected thereto, a variable-load circuit connected to the battery, and a voltage regulator for controlling the voltage of said source, said automatic regulating means comprising the combination, with said regulator, of an electromagnet instrument comprising a stationary magnetizable coil, a movable magnetizable armature, exciting means for said instrument comprising a series coil energized in response to the battery current and a shunt coil energized in response to a voltage of the system, the directions of energization being additive when the battery current is flowing in a charging direction, means for biasing said instrument toward an unactuated position, means effective, upon the operation of said instrument, to so modify the action of said voltage regulator as to cause the same to maintain a lower voltage on the source, and means operative upon the actuation of said instrument to reduce the excitation of said shunt coil, the relative design and proportions of the several parts of the instrument being such that the shunt coil alone is insufficient to effect the operation of the instrument, and such that the energization of the series coil, with a charging current which is barely sufficient to actuate the instrument, is sufficient to hold the instrument in its actuated position after the reduction of the excitation of the shunt coil.

2. Automatic regulating means for a storage-battery charging-system comprising a variable-voltage source of direct current, a battery adapted to be connected thereto, a variable-load circuit connected to the battery, and a voltage regulator for controlling the voltage of said source, said automatic regulating means comprising the combination with said regulator, of a battery-taper relay comprising a stationary magnetizable coil, a movable magnetizable armature, exciting means for said relay comprising a series coil energized in response to the battery current and a shunt coil energized in response to a voltage of the system, the directions of energization being additive when the battery current is flowing in a charging direction, means for biasing said relay toward an unactuated position, electric-circuit means responsive to an actuation of said relay to so modify the action of said voltage regulator as to cause the same to maintain a lower voltage on the source, and means operative upon the actuation of said relay to reduce the excitation of said shunt coil, the relative design and proportions of the several parts of the relay being such that the shunt coil alone is insufficient to effect the operation of the relay, and such that the energization of the series coil, with a charging current which is barely sufficient to actuate the instrument, is sufficient to hold the instrument in its actuated position after the reduction of the excitation of the shunt coil.

3. The invention as defined in claim 1, characterized by the fact that current-responsive means is associated with said voltage regulator for limiting the maximum-current output of said source.

4. The invention as defined in claim 2, characterized by the fact that current-responsive means is associated with said voltage regulator for limiting the maximum-current output of said source.

5. A battery system comprising a storage battery, a variable-load circuit connected thereto, means for connecting a variable source of direct current thereto for the purpose of supplying current to said battery and to said load circuit, a voltage regulator for said source, a current-responsive means for so modifying the operation of said voltage regulator as to limit the maximum current delivered by said source, and an automatically operating battery-taper device operative to reduce the effective voltage of said source when the battery is fully charged, said battery-taper device being so constructed and arranged that it will pick up at a much lower value of battery current in the charging direction than in the discharging direction.

6. A battery system comprising a storage battery, a variable-load circuit connected thereto, means for connecting a variable source of direct current thereto for the purpose of supplying current to said battery and to said load circuit, a voltage regulator for said source, a current-responsive means for so modifying the operation of said voltage regulator as to limit the maximum current delivered by said source, and an automatically operative battery-taper relay having switch contact means for so modifying the operation of the regulator as to reduce the voltage of the source when the battery-taper relay is energized, said battery-taper relay being provided with such energizing means that it will pick up for a lower value of battery current in the charging direction than in the discharging direction.

DONALD W. EXNER.